Nov. 27, 1951  H. J. HORN  2,576,683
HUBCAP
Filed Sept. 1, 1948  2 SHEETS—SHEET 1

Inventor
HARRY J. HORN
By Barnes, Kisselle, Laughlin & Raisch
Attorneys

Nov. 27, 1951　　　　　H. J. HORN　　　　　2,576,683
　　　　　　　　　　　　　HUBCAP

Filed Sept. 1, 1948　　　　　　　　　　　2 SHEETS—SHEET 2

Inventor
HARRY  J.  HORN

By Barnes, Kisselle, Laughlin & Raisch
Attorneys.

Patented Nov. 27, 1951

2,576,683

UNITED STATES PATENT OFFICE 2,576,683

HUBCAP

Harry J. Horn, Lansing, Mich., assignor to Motor Wheel Corporation, Lansing, Mich., a corporation of Michigan Application September 1, 1948, Serial No. 47,273

10 Claims. (Cl. 301—108)

This invention relates to a hub cap for a vehicle wheel.

It is an object of this invention to produce a hub cap for a vehicle wheel which is of relatively simple construction, cheap to produce, and which can be securely but removably attached to the vehicle wheel so that it will not be accidentally lost or detached from the wheel in service.

Figure 1:
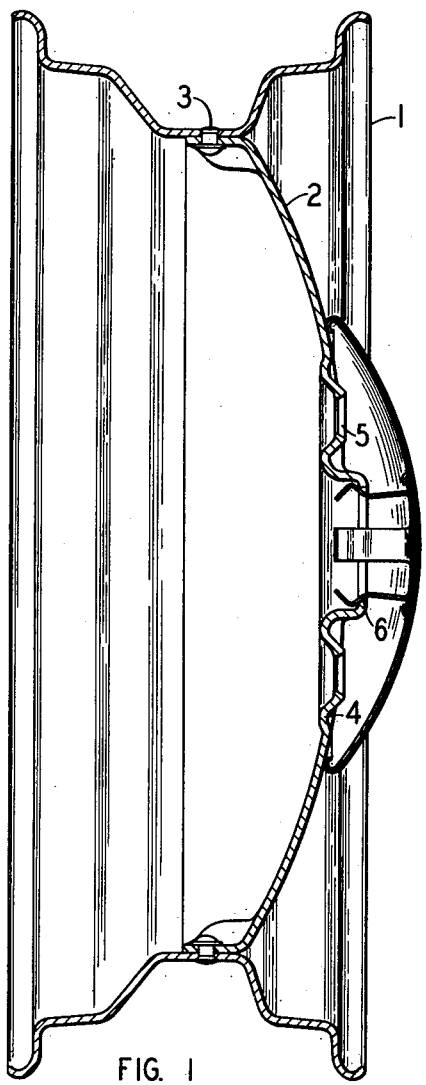
Fig. 1 is a diametrical section through a wheel with my cover attached thereto.
Figure 2:
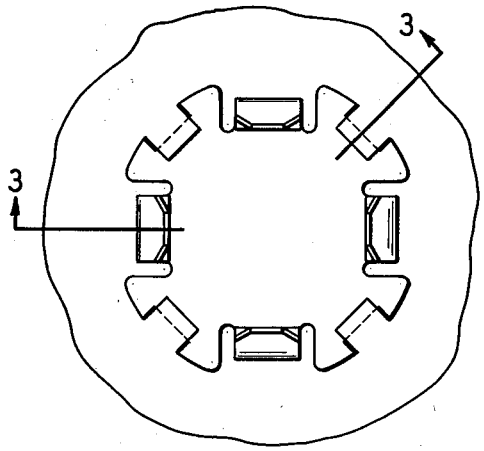
Fig. 2 is a fragmentary inside elevation of my hub cap.
Figure 4:
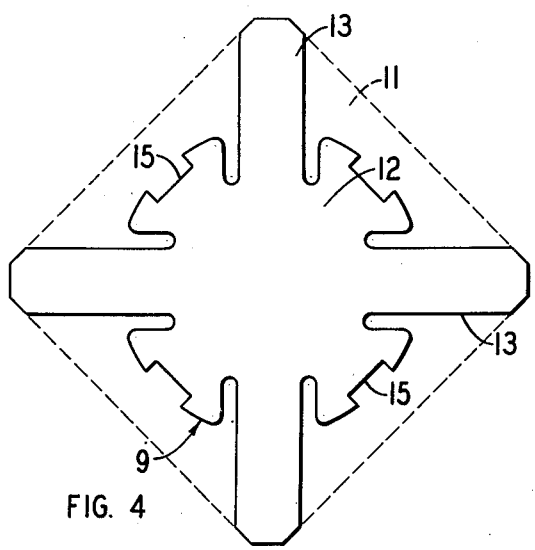
Fig. 4 shows the spring clip attaching means for my hub cap in its flat form.

Referring more particularly to the drawings there is shown a vehicle wheel comprising a metal rim 1, a rolled or stamped metal wheel body 2 secured by rivets 3 to rim 1. The bolting on flange portion of wheel body 2 is designated 4 and is provided with a plurality of circumferentially spaced holes 5 through which the bolts for securing the wheel to the hub (not shown) pass. The wheel body 2 is provided with a central opening 6.

My hub cap assembly comprises three parts; namely, the stamped concave or dished sheet metal cover 7, the ornamental decorative scalp 8, and the spring attaching clip 9.

The cover 7 is provided with a rolled edge 10 over which scalp 8 is formed to retain the scalp on the cover.

Scalp 8 can be made from any suitable decorative or ornamental thin sheet metal, such as stainless steel, sheet steel or brass with a chromium plate.

Figure 3:
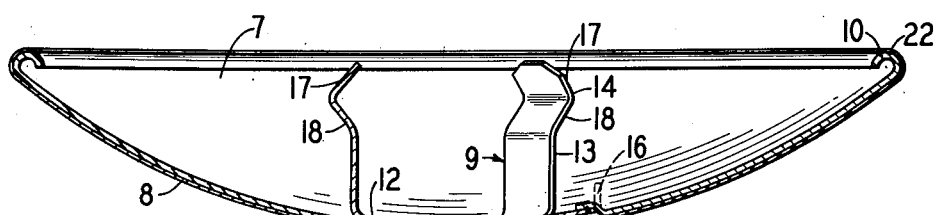
Fig. 3 is a section along the line 3—3 of Fig. 2.

Clip member 9 is stamped from a flat blank 11 of spring steel and comprises a base 12 and four spring fingers 13 formed substantially perpendicular to base 12. Each spring finger is provided with a V shoulder 14 at the outer end thereof. Base 12 is provided at its outer edge with four circumferentially spaced notches 15. Clip 9 is positioned within, and centrally of, the cover 7, as shown in Figs. 1 and 3, so that the base 12 rests upon the inner face of cover 7. Four fingers 16 are sheared out of cover 7, dotted line showing Fig. 3, and interengage base 12 in notches 15. Fingers 16 are then turned downwardly, full line showing Fig. 3, to securely attach clip 9 to cover 7. Since fingers 16 interengage base 12 in notches 15, clip member 9 is securely fixed to cover 7 and cannot rotate thereon or rattle.

To assemble the hub cap to the wheel, spring clip fingers 16 are aligned with central opening 6 in the wheel body 2 and the hub cap is pushed toward the wheel body. The inclined outer faces 17 of shoulders 14 serve as cams and upon engagement with the edge of opening 6 cam spring fingers 14 radially inwardly until the circumferential edge of opening 6 passes over the hump and interengages the oppositely inclined faces 18 of clips 13 whereupon the clips yieldably and resiliently cooperate with opening 6 to retain the cap on the wheel. The cover can be removed from the wheel by inserting a screw-driver or similar instrument between the beaded edge of the cover and the wheel body to pry the cover outwardly from the wheel body whereupon the spring fingers 13 are disengaged from opening 6.

Figure 5:
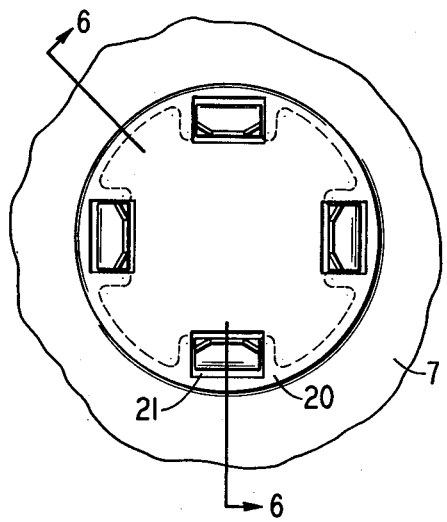
Fig. 5 is a fragmentary inside elevation of a modified form of my hub cap.
Figure 6:
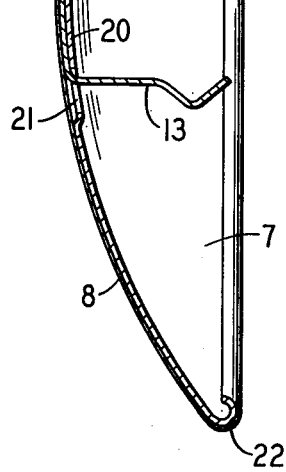
Fig. 6 is a section along the line 6—6 of Fig. 5.
Figure 7:
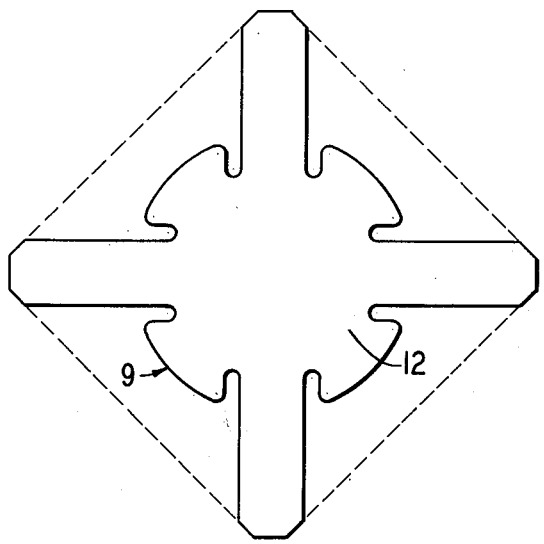
Fig. 7 shows a modified form of clip for use with the hub cap shown in Fig. 6.

The form of hub cap shown in Figs. 5, 6 and 7 differs only in the manner in which spring clip member 9 is secured to the cap. Clip 9 in the form of cap shown in Figs. 5 to 7, need not be notched and accordingly notches 15 are omitted. In this form of the invention cover 7 is provided with a centrally embossed portion 20 corresponding in area to the base member 12 of clip 9. Embossment 20 is provided with four openings 21.

In assembling clip 9 to cover 7, spring fingers 13 are passed through apertures 21 so that the upper face of base 12 contacts the outer face of embossment 20 in cover 7. Thus, base 12 nests in embossment 20 and is fixed thereto by spot welding. After clip 9 has been secured to cover 7, then scalp 8 is mounted on the outside of cover 7 and secured thereto by rolling the circumferential edge 22 of scalp 8 over the beaded edge 10 of cover 7.

In each form of the hub cap scalp 8 is preferred but, of course, can be omitted if desired. The hub cap shown in Figs. 5 to 7 is secured to the wheel body in the same manner as the hub cap shown in Figs. 1 to 4.

I claim:

1. In combination a concave hub cap and means adapted to secure the cap to a vehicle wheel, said means comprising a base and a plurality of spring fingers formed integrally with said base and extending substantially perpendicular thereto, said base being secured to the central portion of said concave cap on the inner face thereof with the spring fingers positioned about the center of the cap and extending axially inwardly of the cap, said fingers being free to flex radially of said cap, said hub cap having a plurality of inwardly struck lugs bent to overlie the exposed edge portions of said base between said fingers so as to fix said base on the inner face of said cap.

2. In combination a concave hub cap and means adapted to secure the cap to a vehicle wheel, said means comprising a base and a plurality of spring fingers formed integrally with said base and extending substantially perpendicular thereto, said base being secured to the central portion of said concave cap on the inner face thereof with the spring fingers positioned about the center of the cap and extending axially inwardly of said cap, said fingers being free to flex radially of said cap, said base having a plurality of spaced notches therein, said hub cap having a plurality of inwardly struck lugs therein, said lugs being spaced apart to correspond with the spacing of said notches, said lugs projecting inwardly through said notches and being bent to overlie the exposed inner face of said base adjacent said notches.

3. The combination claimed in claim 2 including an ornamental scalp secured to the outer convex face of said cap.

4. In combination a concave hub cap and means adapted to secure the cap to a vehicle wheel, said means comprising a base and a plurality of spring fingers spaced around the edge of said base and extending substantially perpendicular thereto, said base being secured to the central portion of said concave cap with the spring fingers being positioned about the center of the cap and extending axially inwardly of the cap, the peripheral edge portion of said base having notches therein spaced between said fingers, the hub cap having a plurality of inwardly struck lugs therein, said lugs being spaced apart circumferentially to correspond with the spacing of said notches, said lugs projecting inwardly through said notches and extending radially inwardly to overlie the base at portions thereof adjacent said notches.

5. The combination claimed in claim 4 wherein each of said spring fingers is provided with a V shoulder adjacent its free end and including an ornamental scalp secured to the outer convex face of said cap.

6. The combination claimed in claim 1 wherein each of said spring fingers is provided with a V shoulder at its outer end.

7. The combination claimed in claim 1 wherein said spring fingers are positioned circumferentially about said base and are spaced substantially equidistant from each other.

8. The combination claimed in claim 1 wherein the spring fingers and base constitute an integral stamped metal member.

9. In combination a concave hub cap and means adapted to secure the cap to a vehicle wheel, said means comprising a base and a plurality of spring fingers carried by said base and extending substantially perpendicular thereto, said base being secured to the central portion of said concave cap with said spring fingers positioned about the center of the cap and extending axially of the concave face of said cap, said fingers being free to flex radially of the said cap, said base having a plurality of spaced notches in the edge thereof, and a plurality of fingers struck out of said hub cap and interengaging said base in said notches to fix the base to said hub cap.

10. The combination claimed in claim 9 including an ornamental scalp secured to the outer convex face of said cap.

HARRY J. HORN.

REFERENCES CITED

The following references are of record in the file of this patent:

UNITED STATES PATENTS

| Number | Name | Date |
|---|---|---|
| 2,002,872 | Sinclair | May 28, 1935 |
| 2,129,115 | Best | Sept. 6, 1938 |
| 2,145,089 | Kysor | Jan. 24, 1939 |
| 2,196,990 | Hunt | Apr. 16, 1940 |
| 2,217,086 | Whitacre | Oct. 8, 1940 |
| 2,386,245 | Lyon | Oct. 9, 1945 |

FOREIGN PATENTS

| Number | Country | Date |
|---|---|---|
| 267,488 | Great Britain | 1927 |